Dec. 31, 1935.                C. S. VOELCKER                2,025,963
                              FOOTED GLASS SANDAL
                              Filed April 2, 1935
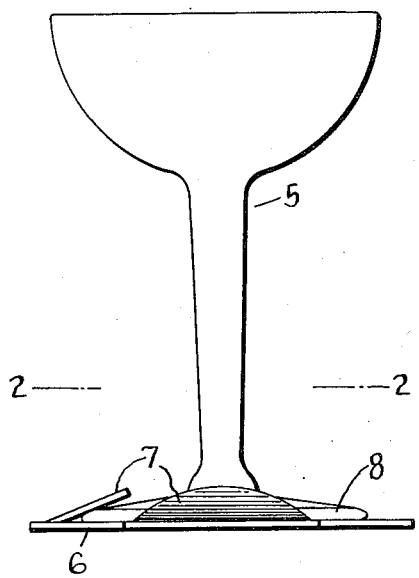
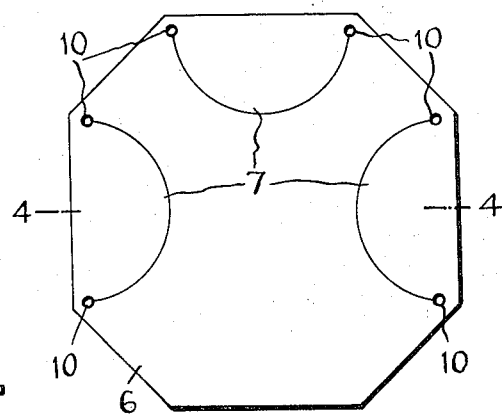
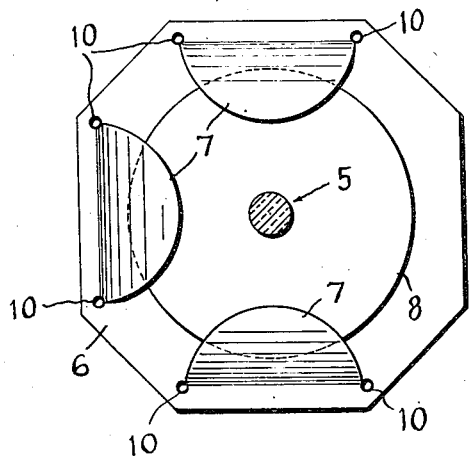
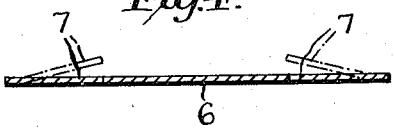
INVENTOR
Carl S. Voelcker,
BY
HIS ATTORNEY Patented Dec. 31, 1935

2,025,963

UNITED STATES PATENT OFFICE 2,025,963

FOOTED-GLASS SANDAL

Carl S. Voelcker, Glen Cove, N. Y., assignor of one-half to Donald Campbell, Montclair, N. J.

Application April 2, 1935, Serial No. 14,192

1 Claim. (Cl. 65—53)

The invention relates to a footed-glass sandal.

It is well known that glasses containing iced or cold drinks sweat. The moisture dripping from the glasses will discolor or stain garments or furniture.

One of the principal objects of the present invention is to provide an absorbent coaster or sandal of extreme simplicity, and one that remains attached to the glass as long as desired.

The sandal or coaster is easily and quickly slipped on the foot of the glass and provides a base for the glass of considerably larger area. The glass is thus less liable to upset or be tilted and if a small amount of its contents should drip over they will be taken up by the absorbent coaster. Due to the fact of long stemmed glasses not being liable to tip over so easily considerable breakage is also saved.

Referring to the drawing in which a preferred form of the invention is illustrated:

Fig. 1 is an elevational view showing a footed-glass in position on the sandal;

Fig. 2 is a plan view taken on the line 2—2 of Fig. 1, the stem of the glass being in section;

Fig. 3 is a plan view of the sandal or absorbent coaster; and

Fig. 4 is a sectional view taken on line 4—4 of Fig. 3.

Referring again to said drawing the reference numeral 5 designates a conventional long-stemmed or footed-glass such as might be used for cocktails, wine or beer.

The sandal comprises a semi-rigid flat sheet 6 of highly absorbent material. Two or more tabs or tongues 7 are formed in this sheet. Three such tongues are illustrated. The arrangement of three tongues provides an entrance for the glass in relation to the sandal and permits of easily slipping the sandal onto the bottom or foot 8 of the glass and due to contacting on three sides insures its attachment thereto.

The sandal or coaster as heretofore stated is made of a flat sheet of highly absorbent material. The tongues or tabs 7 are cut with a die simultaneously with the cutting of the sandal. When shipped or sold the sandal is perfectly flat as illustrated in Figs. 3 and 4. In use, prior to serving the drinks, the tongues or tabs 7 are pressed upwardly a slight amount as shown in full lines in Fig. 1 and broken lines in Fig. 4 and the foot of the glass is slipped into position.

Due to being made of a flat sheet the sandal is particularly adapted to act as an advertising medium. Before it has been stamped suitable advertising matter may be imprinted on either one or both sides of the sandal.

Changes in details and shapes or configuration may be made without departing from the spirit of the invention.

I claim:

A footed-glass sandal comprising a single, flat sheet of highly absorbent material and stamped to provide a plurality of slits, each of said slits defining a tongue, the base of said tongue being integral with said sheet, spaced inwardly from the marginal edge thereof and positioned adjacent the periphery thereof, the tongues being adapted to overlie the foot of a glass and thereby secure said sandal to the underface of the foot of the glass.

CARL S. VOELCKER.